United States Patent
Li (10) Patent No.: US 10,197,903 B2
(45) Date of Patent: Feb. 5, 2019

(54) PROJECTION DISPLAY APPARATUS

(71) Applicant: BOE TECHNOLOGY GROUP CO., LTD., Beijing (CN)

(72) Inventor: Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 2 days.

(21) Appl. No.: 15/522,274

(22) PCT Filed: May 13, 2016

(86) PCT No.: PCT/CN2016/082003
§ 371 (c)(1),
(2) Date: Apr. 26, 2017

(87) PCT Pub. No.: WO2017/152489
PCT Pub. Date: Sep. 14, 2017

(65) Prior Publication Data
US 2018/0088454 A1 Mar. 29, 2018

(30) Foreign Application Priority Data
Mar. 9, 2016 (CN) .......................... 2016 1 0132944

(51) Int. Cl.
*G03B 21/56* (2006.01)
*G03B 21/20* (2006.01)
(Continued)

(52) U.S. Cl.
CPC .............. *G03B 21/56* (2013.01); *G02B 5/13* (2013.01); *G02B 27/225* (2013.01);
(Continued)

(58) Field of Classification Search
CPC ................ G03B 21/606; G03B 21/56
(Continued)

(56) References Cited

U.S. PATENT DOCUMENTS 5,222,071 A * 6/1993 Pezeshki ................ B82Y 20/00
257/21
8,157,385 B2 * 4/2012 Aruga ...................... G02B 5/09
353/37
(Continued)

FOREIGN PATENT DOCUMENTS

| CN | 102119362 A | 7/2011 |
| CN | 102413344 A | 4/2012 |
| CN | 104054336 A | 9/2014 |
| CN | 104220921 A | 12/2014 |
| CN | 105549314 A | 5/2016 |

OTHER PUBLICATIONS

Innternational Search Report and Written Opinion (including English translation of Box V) dated Nov. 28, 2016, for corresponding PCT Application No. PCT/CN2016/082003.

*Primary Examiner* — Christopher Mahoney
(74) *Attorney, Agent, or Firm* — Kinney & Lange, P.A.

(57) ABSTRACT

Embodiments of the disclosure provide a projection display apparatus comprising: a light source for emitting a light beam; a first light path configured to project the light beam emitted from the light source to a first display position; a second light path configured to project the light beam emitted from the light source to a second display position; a light patch switching device configured to switch the light beam emitted from the light source between the first light path and the second light path; and a light modulation device through which both the first light path and the second light path pass, wherein the light modulation device is configured to modulate the light beam passing therethrough to generate a display image.

20 Claims, 5 Drawing Sheets

(51) Int. Cl.
*G02B 5/13* (2006.01)
*G02B 27/22* (2018.01)
*G03B 35/24* (2006.01)
*G03B 35/26* (2006.01)
*G03B 21/13* (2006.01)
*G03B 33/10* (2006.01)
*G03B 21/00* (2006.01)

(52) U.S. Cl.
CPC ....... *G02B 27/2214* (2013.01); *G03B 21/005* (2013.01); *G03B 21/13* (2013.01); *G03B 21/20* (2013.01); *G03B 21/2066* (2013.01); *G03B 33/10* (2013.01); *G03B 35/24* (2013.01); *G03B 35/26* (2013.01)

(58) Field of Classification Search
USPC .......................................................... 353/82
See application file for complete search history.

(56) References Cited

U.S. PATENT DOCUMENTS

| | | | |
|---|---|---|---|
| 8,651,667 B2* | 2/2014 | Katou | G02B 26/008 348/744 |
| 8,982,459 B1 | 3/2015 | Coley et al. | |
| 2009/0278918 A1* | 11/2009 | Marcus | G02B 27/2228 348/54 |
| 2010/0208342 A1* | 8/2010 | Olsen | H04N 13/324 359/464 |
| 2011/0181840 A1* | 7/2011 | Cobb | H04N 9/3111 353/31 |
| 2014/0185014 A1* | 7/2014 | Huang | G02B 27/2207 353/7 |
| 2014/0327601 A1* | 11/2014 | Tilleman | G02B 5/30 345/7 |
| 2015/0015855 A1* | 1/2015 | Wang | G02B 27/2235 353/121 |

* cited by examiner

PROJECTION DISPLAY APPARATUS

CROSS-REFERENCE TO RELATED APPLICATION

This application is a national phase application from PCT/CN2016/082003 filed on May 13, 2016 and claims the benefit of Chinese Patent Application No. CN201610132944.3 filed on Mar. 9, 2016 in the State Intellectual Property Office of China, the whole disclosure of which is incorporated herein by reference.

BACKGROUND OF THE INVENTION

Field of the Invention

Embodiments of the disclosure relate to the field of projection display technique, in particular to a projection display apparatus.

Description of the Related Art

A liquid crystal display such as a liquid crystal television display, a liquid crystal projection display is widely used in daily production and living due to its large color gamut, wide viewing angle, thin structure and the like. Recently, a home projector has been gradually become popular due to its small volume and little home space occupancy. Further, the home projector can be easily moved and can display images at various positions such as walls, ceilings. Furthermore, the home projector has good display effect. Thus, it is possible to realize watching effect like in a movie theater at home.

The existing liquid crystal projector normally realizes image projection through splitting a light beam emitted from a light source to generate a plurality of sub light paths for different colors such as red, green and blue and then combining the light beams from different sub light paths. This liquid crystal projector can only display a single picture.

SUMMARY OF THE INVENTION

Embodiments of the disclosure provide a projection display apparatus which can at least realize multi-screen projection display to satisfy the demand to watch different pictures at different positions.

Embodiments of the disclosure provide a projection display apparatus comprising: a light source for emitting a light beam; a first light path configured to project the light beam emitted from the light source to a first display position; a second light path configured to project the light beam emitted from the light source to a second display position; a light patch switching device configured to switch the light beam emitted from the light source between the first light path and the second light path; and a light modulation device through which both the first light path and the second light path pass, wherein the light modulation device is configured to modulate the light beam passing therethrough to generate a display image.

In an exemplary embodiment of the disclosure, the light modulation device is configured to modulate the light beam in the first light path to generate a first display image for the first display position when the light path switching device switches the light beam emitted from the light source to the first light path, and to modulate the light beam in the second light path to generate a second display image for the second display position when the light path switching device switches the light beam emitted from the light source to the second light path.

In an exemplary embodiment of the disclosure, the first display image is different from the second display image.

In an exemplary embodiment of the disclosure, the light modulation device comprises a light intensity modulation portion having a plurality of first modulation units to modulate a light intensity of the light beam in the first light path to form an intensity distribution in the light beam of the first light path corresponding to the first display image and a plurality of second modulation units to modulate a light intensity of the light beam in the second light path to form an intensity distribution in the light beam of the second light path corresponding to the second display image.

In an exemplary embodiment of the disclosure, the first modulation units and the second modulation units are alternatively arranged with each other.

In an exemplary embodiment of the disclosure, each of the first and second modulation units has a size less than 0.032 mm.

In an exemplary embodiment of the disclosure, the light intensity modulation portion is configured to regulate light transmittance of the second modulation units to be lower than a predetermined value when the light path switching device switches the light beam emitted from the light source to the first light path and to regulate light transmittance of the first modulation units to be lower than the predetermined value when the light path switching device switches the light beam emitted from the light source to the second light path.

In an exemplary embodiment of the disclosure, the light intensity modulation portion is in a normally dark mode.

In an exemplary embodiment of the disclosure, the light intensity modulation portion is configured to respectively apply drive signals corresponding to the first display image to the first modulation units to generate the first display image without applying drive signals to the second modulation units when the light path switching device switches the light beam emitted from the light source to the first light path, and to respectively apply drive signals corresponding to the second display image to the second modulation units to generate the second display image without applying drive signals to the first modulation units when the light path switching device switches the light beam emitted from the light source to the second light path.

In an exemplary embodiment of the disclosure, the light source is a white light source and the light modulation device further comprises a color filter comprising a plurality of filtering units, each of which comprises a plurality of pairs of filtering subunits sequentially arranged, wherein each pair of filtering subunits only allows light of one color to pass therethrough, and each pair of filtering subunits comprises a first filtering subunit and a second filtering subunit adjacent to each other, wherein each of the first filtering subunits corresponds to one of the first modulation units of the light intensity modulation portion, and each of the second filtering subunits corresponds to one of the second modulation units of the light intensity modulation portion.

In an exemplary embodiment of the disclosure, the plurality of pairs of filtering subunits comprise a pair of red filtering subunits, a pair of green filtering subunits and a pair of blue filtering subunits.

In an exemplary embodiment of the disclosure, the light path switching device is configured to switch the light beam between the first light path and the second light path at a switching frequency above 120 Hz.

In an exemplary embodiment of the disclosure, the light path switching device comprises a rotatory reflector.

In an exemplary embodiment of the disclosure, the first light path is provided with a first reflector and a first projection lens therein, wherein when the light path switching device switches the light beam emitted from the light source to the first light path, the first reflector guides the light beam from the light path switching device to the light modulation device, and the first projection lens projects the light beam modulated by the light modulation device to the first display position. The second light path is provided with a second reflector and a second projection lens therein, wherein when the light path switching device switches the light beam emitted from the light source to the second light path, the second reflector guides the light beam from the light path switching device to the light modulation device, and the second projection lens projects the light beam modulated by the light modulation device to the second display position.

In an exemplary embodiment of the disclosure, the light intensity modulation portion is formed by a liquid crystal light valve.

In an exemplary embodiment of the disclosure, the first display position is spaced apart from the second display position without overlapping with each other.

DETAILED DESCRIPTION OF PREFERRED EMBODIMENTS OF THE INVENTION

The solution of the disclosure will be further described below with reference to the accompanying drawings through embodiments thereof. In the description, the same numerical references denote the same or similar elements. The following description to the embodiments of the disclosure with reference to the accompanying drawings is intended to interpret the general concept of the disclosure, rather than limiting the disclosure.

According to the general concept of the disclosure, there is provided a projection display apparatus comprising: a light source for emitting a light beam; a first light path configured to project the light beam emitted from the light source to a first display position; a second light path configured to project the light beam emitted from the light source to a second display position; a light patch switching device configured to switch the light beam emitted from the light source between the first light path and the second light path; and a light modulation device through which both the first light path and the second light path pass, wherein the light modulation device is configured to modulate the light beam passing therethrough to generate a display image.

According to embodiments of the disclosure, the light path switching device can switch the light beam between the first and second light paths and the light modulation device can make corresponding modulation on the light beam based on the operation of the light path switching device. Thus, it is possible to realize the multipath image display at different display positions.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 1:
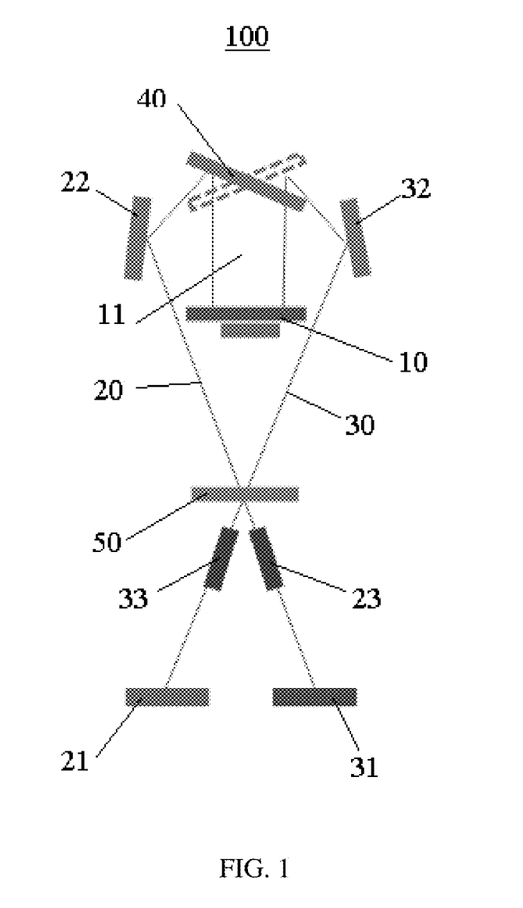
FIG. 1 schematically shows a projection display apparatus according to an exemplary embodiment of the disclosure.

FIG. 1 is a projection display apparatus 100 according to an exemplary embodiment of the disclosure. The projection display apparatus 100 comprises a light source 10 for emitting a light beam, a first light path 20 configured to project the light beam 11 emitted from the light source 10 to a first display position 31, a second light path 30 configured to project the light beam 11 emitted from the light source 10 to a second display position 21, a light patch switching device 40 configured to switch the light beam 11 emitted from the light source 10 between the first light path 20 and the second light path 30, and a light modulation device 50 through which both the first light path 20 and the second light path 30 pass. The light modulation device 50 is configured to modulate the light beam passing therethrough to generate a display image. Since the first light path 20 and the second light path 30 can project the light beam 11 to the first display position 21 and the second display position 31, respectively, the projection display apparatus 100 according to the embodiment of the disclosure can generate images at two display positions. Therefore, viewers at different positions may view images formed by different light paths. The images formed by the different light paths may be same as or different from each other, which is dependent on the light modulation device 50. In particular, when it is required to display different display images at different display positions, the light modulation device 50 may generate different images through modulating the first light path 20 and the second light path 30 in different ways.

In the embodiment of the disclosure, the light path switching device 40 switches the first light path 20 and the second light path 30 to realize a multipath display corresponding to different display positions by using a single light source, for example, to alternatively display a first display image at the first display position 31 and a second display image at the second display position 21. In an example, the light modulation device 50 may be configured to modulate the light beam 11 in the first light path 20 to generate the first display image for the first display position 31 when the light path switching device 40 switches the light beam 11 emitted from the light source 10 to the first light path 20, and modulate the light beam 11 in the second light path 30 to generate the second display image for the second display position 21 when the light path switching device 40 switches the light beam 11 emitted from the light source 10 to the second light path 30. Under this action of the light path switching device 40, actually, only one light beam can pass through the light modulation device 50 to arrive at its corresponding display position at each time. Further, the light modulation device 50 may perform different modulations on the light beam 11 passing therethrough based on the different display positions. In this way, it is possible to prevent the first light path 20 and the second light path 30 from interfering with each other during image display. The cooperation of the light modulation device 50 with the light path switching device 40 will ensure that at different display positions the display images corresponding thereto are generated.

In an example, the first display image and the second display image respectively corresponding to the first display position 31 and the second display position 21 may be different images from each other. This may be adapted to many application requirements. For example, in a 3D display, it may require two eyes to view the images different from each other. In another example, in some conferences, it is desirable for viewers seated in different seats to view images of different contents such as different languages. However, the first and second display images may also be the same image so that the viewers at different positions can view the same image as they desire for example.

Figure 2:
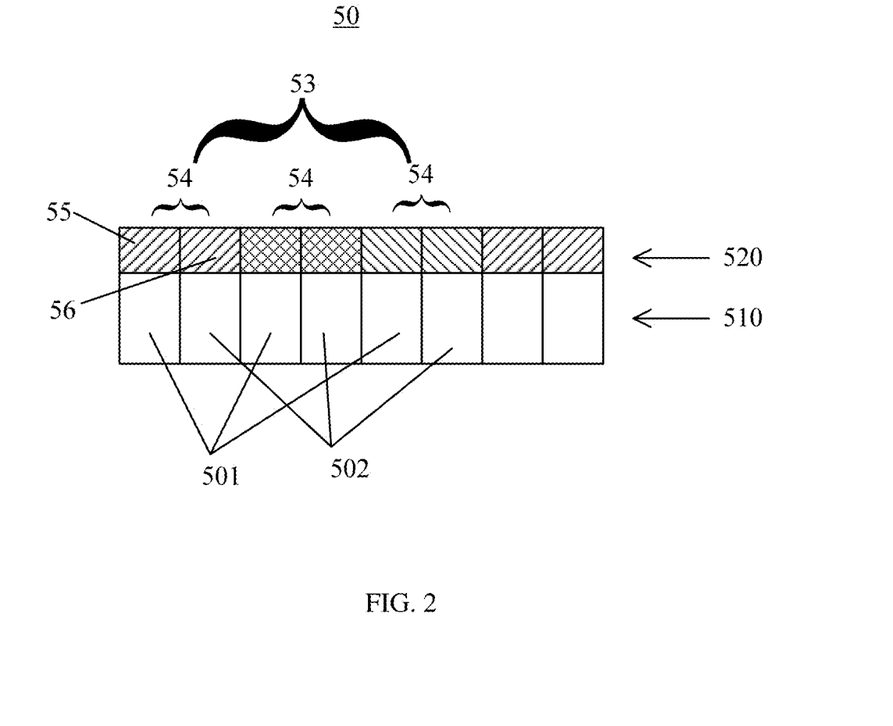
FIG. 2 schematically shows a light modulation device of a projection display apparatus according to an exemplary embodiment of the disclosure.

In an example, the light modulation device 50 may comprise a light intensity modulation portion 510 for modulating a light intensity of the light beam passing through the light modulation device 50. As an example, the light intensity modulation portion 510 has a plurality of first modulation units 501 to modulate the light intensity of the light beam in the first light path 20 to form an intensity distribution in the light beam of the first light path 20 corresponding to the first display image and a plurality of second modulation units 502 to modulate the light intensity of the light beam in the second light path 30 to form an intensity distribution in the light beam of the second light path 30 corresponding to the second display image. The first modulation units 501 and the second modulation units 502 are configured to generate the first display image corresponding to the first display position 31 and the second display image corresponding to the second display position 21, respectively. Each of the first modulation units 501 is used to form a pixel or sub-pixel of the first display image, and each of the second modulation units 502 is used to form a pixel or sub-pixel of the second display image. The number of the first modulation units 501 and the second modulation units 502 is determined by resolution of the first and second display images. During the operation of the light modulation device 50, drive control signals can be applied to each of the first modulation units 501 and the second modulation units 502 to control light transmittance thereof. As an example, the light intensity modulation portion 510 may be implemented by a liquid crystal light valve such as a high temperature polycrystalline silicon (HTPS). For example, the light intensity modulation portion 510 may be implemented by a liquid crystal display (LCD) screen with the well-known 1G2D structure (1G means gate lines are arranged so that one gate line is disposed between adjacent sub-pixels, and 2D means data lines are arranged so that two data lines are disposed between adjacent sub-pixels). With this technology, the LCD screen may easily realize a refreshing frequency of 120 Hz.

As an example, as shown in FIG. 2, the first modulation units 501 and the second modulation units 502 are alternatively arranged with each other. With this arrangement, the first modulation units 501 and the second modulation units 502 may be alternatively distributed in a wide region of the light modulation device 50, which facilitates fully utilizing the intensity of the light beam irradiated onto the light modulation device 50 to improve imaging effect. This arrangement also allows the light beam passing through any one of the first and second light paths to be fully displayed on the whole display screen, thereby facilitating fully utilizing the resolution of the display screen to display images to provide better viewing effect for the viewer. The disclosure, however, is not limited thereto. For example, the first modulation units 501 and the second modulation units 502 may be arranged in two regions of the light modulation device 50 respectively, rather than being alternatively arranged.

Although the above arrangement may result in a sacrifice in image resolution compared with a single projection image, this may be compensated through properly reducing sizes of the first modulation units 501 and second modulation units 502 or improving densities of the first modulation units 501 and second modulation units 502. In an example of the disclosure, in order to improve visual effect of the human eye, the size, for example, the width, of each of the first modulation units 501 and second modulation units 502, may be less than 0.032 mm. In this way, it is possible to ensure that the size of each of the first modulation units 501 and second modulation units 502 is smaller than limit of resolution of human eyes.

Figure 4A:
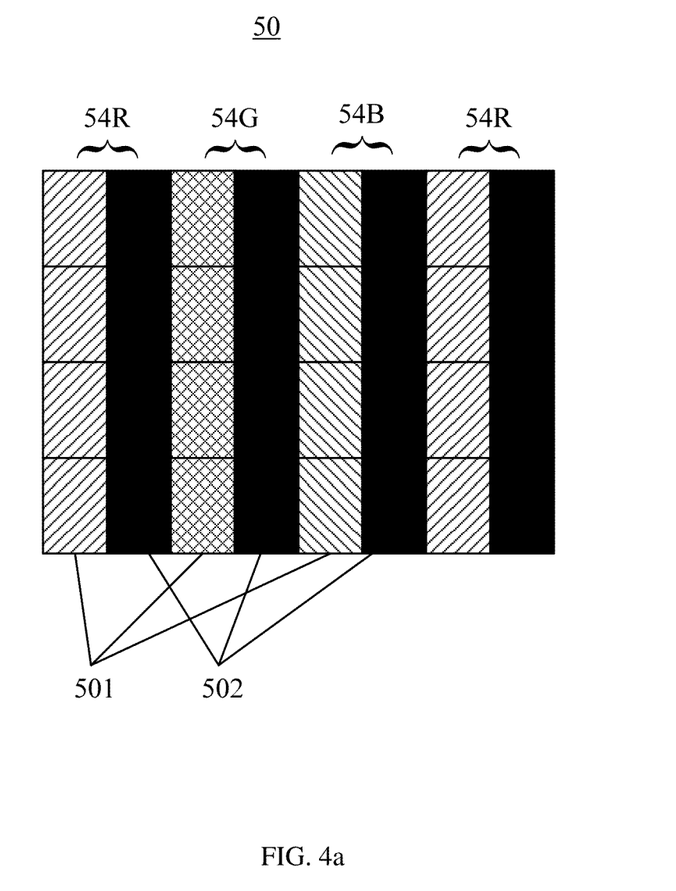
FIGS. 4a and 4b schematically show an operation of a light modulation device of a projection display apparatus in a dual-screen display mode according to an exemplary embodiment of the disclosure.
Figure 4B:
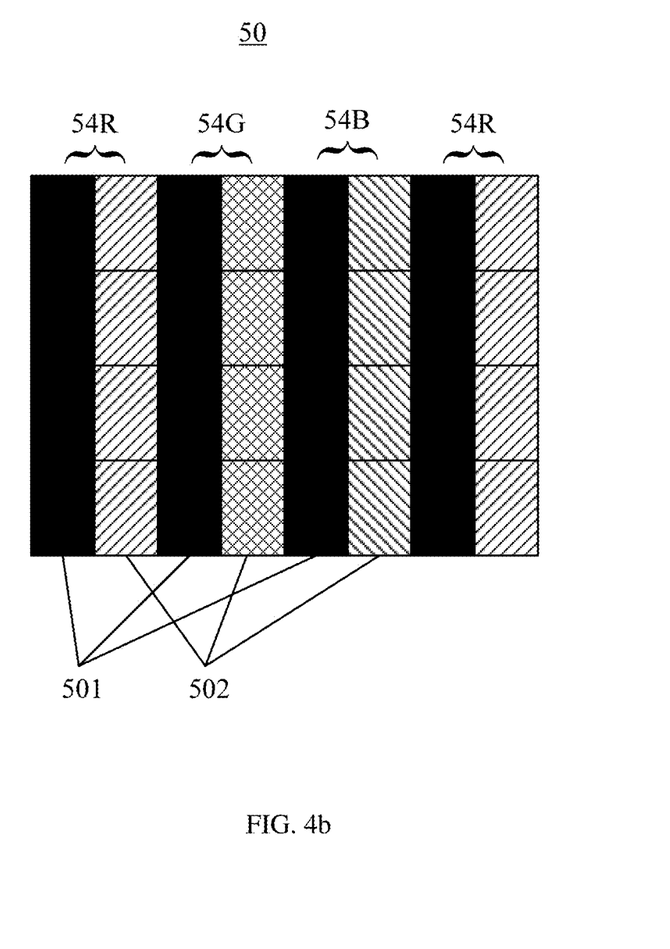

In an example of the disclosure, the light intensity modulation portion 510 may be configured to regulate light transmittance of the second modulation units 502 for the second light beam 11 to be lower than a predetermined value when the light path switching device 40 switches the light beam 11 emitted from the light source 10 to the first light path 20 and to regulate light transmittance of the first modulation units 501 for the light beam 11 to be lower than this predetermined value when the light path switching device 40 switches the light beam 11 emitted from the light source 10 to the second light path 30. This predetermined value may be substantially lower than normal light transmittance of the first modulation units 501 and the second modulation units 502 when forming displaying images. For example, the predetermined value may be 0.5% or even lower. As illustrated in FIG. 4a, when the light path switching device 40 switches the light beam 11 emitted from the light source 10 to the first light path 20, the light transmittance of the second modulation units 502 for the light beam 11 becomes very low, thus the second modulation units 502 are displayed as black color. On the contrary, as shown in FIG. 4b, when the light path switching device 40 switches the light beam 11 emitted from the light source 10 to the second light path 30, the light transmittance of the first modulation units 501 for the light beam 11 becomes very low, thus the first modulation units 501 are displayed as black color. That is, in this example, the light transmittance of the second modulation units 502 is very low or completely lightproof when the first modulation units 501 works, and the light transmittance of the first modulation units 501 is very low or completely lightproof when the second modulation units 502 works. This can prevent the first modulation units 501 and the second modulation units 502 from being interfered with each other during forming the display images to improve contrast of display image.

In an example of the disclosure, the light intensity modulation portion is in a normally dark mode, i.e., being lightproof when no drive signals are applied. When the light intensity modulation portion 510 is driven, if the light path switching device 40 switches the light beam 11 emitted from the light source 10 to the first light path 20, the drive signals corresponding to the first display image may be respectively applied to the first modulation units 501 located in odd columns in FIGS. 4a and 4b to generate the first display image, and no drive signals are applied to the second modulation units 502 so that the second modulation units 502 are lightproof. On the contrary, if the light path switching device 40 switches the light beam 11 emitted from the light source 10 to the second light path 30, the drive signals corresponding to the second display image are respectively applied to the second modulation units 502 located in even columns in FIGS. 4a and 4b to generate the second display image, and no drive signals are applied to the first modulation units 501 so that the first modulation units 501 are lightproof. With this arrangement, it is possible to save power consumption by selectively choosing the first or second modulation units to apply no drive signals.

Note that, the projection apparatus 100 according to embodiments of the disclosure may also realize a single image display at the first or second display position. In this case, the light path switching device 40 will not perform the light path switching operation, and the first modulation units 501 and the second modulation units 502 corresponding to each other may be applied with the same drive signals.

In an example of the disclosure, the light source may be a white light source. The disclosure, however, is not limited herein. For example, the light source may also be a monochromatic light source. In a case of the white light source, in order to form color images, the light modulation device 50 may also comprise a color filter 520 including a plurality of filtering units 53, each of which includes a plurality of pairs of filtering subunits 54 sequentially arranged. Each pair of filtering subunits 54 only allows light of one color to pass therethrough. Each pair of filtering subunits 54 includes a first filtering subunit 55 and a second filtering subunit 56 adjacent thereto. Each of the first filtering subunits 55 corresponds to one of the first modulation units 501 of the light intensity modulation portion 510, and each of the second filtering subunits 56 corresponds to one of the second modulation units 502 of the light intensity modulation portion 510. As an example of the disclosure, each filtering unit 53 may correspond to one pixel of the first or second display image, each first filtering subunit 55 may correspond to one sub-pixel of the first display image, and each second filtering subunit 56 may correspond to one sub-pixel of the second display image. With this arrangement, it is possible to easily modulate the respective sub-pixels of the two display images to be conveniently compatible with data of the existing display images. As an example of the disclosure, the color filter 520 may be located on a side of the light intensity modulation portion 510 facing away from the first display position 31 and the second display position 21, i.e., the light beam is firstly filtered by the color filter 520 and then modulated by the light intensity modulation portion 50. Alternatively, the color filter 520 may be located on a side of the light intensity modulation portion 510 facing the first display position 31 and the second display position 21, i.e., the light beam is firstly modulated by the light intensity modulation portion 50 and then filtered by the color filter 520.

Figure 3:
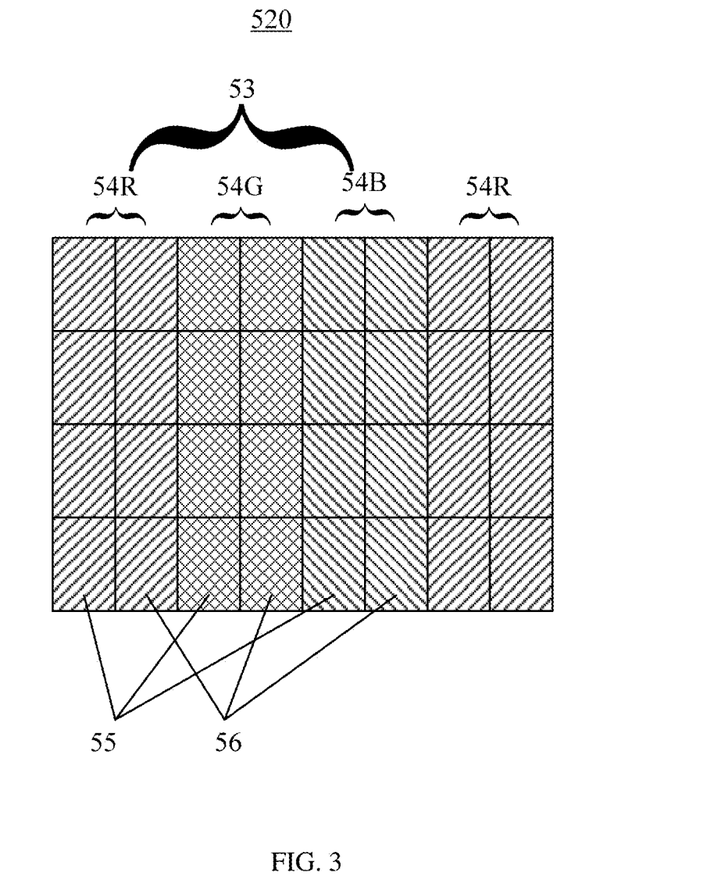
FIG. 3 schematically shows a filtering sub-unit of a projection display apparatus according to an exemplary embodiment of the disclosure.

In an example of the disclosure, as shown in FIG. 3, the plurality of pairs of filtering subunits 54 include a pair of red filtering subunits 54R, a pair of green filtering subunits 54G and a pair of blue filtering subunits 54B. The red filtering subunits 54R, the green filtering subunits 54G and the blue filtering subunits 54B may correspond to red sub-pixels, green sub-pixels and blue sub-pixels of the display images, respectively. In the example shown in FIG. 3, in the pair of the red filtering subunits 54R, the left red filtering subunit 54R may be used to form one red sub-pixel of the first display image, and the right red filtering subunit 54R may be used to form one red sub-pixel of the second display image. Likewise, in the pair of the green filtering subunits 54G, the left green filtering subunit 54G may be used to form one green sub-pixel of the first display image, and the right green filtering subunit 54G may be used to form one green sub-pixel of the second display image, and in the pair of the blue filtering subunits 54B, the left blue filtering subunit 54B may be used to form one blue sub-pixel of the first display image, and the right blue filtering subunit 54B may be used to form one blue sub-pixel of the second display image. Further, each filtering subunit corresponds to one of the first modulation units 501 or the second modulation units 502 of the light intensity modulation portion 510. Accordingly, as the light path switching device 40 performs the light path switching operation, the first modulation units 501 or the second modulation units 502 of the light intensity modulation portion 510 may be driven based on images to be displayed so that each sub-pixel of the display image obtains desired light intensity, and the filtering subunits 54 such as red filtering subunits 54R, the green filtering subunits 54G and the blue filtering subunits 54B can allow each sub-pixel of the display image to obtain desired color.

The filtering subunits 54 of the embodiments of the disclosure are not limited to the red filtering subunits 54R, the green filtering subunits 54G and the blue filtering subunits 54B. As an example of the disclosure, the plurality of pairs of filtering subunits 54 may also comprises other color filtering subunits such as yellow filtering subunits.

In the embodiments of the disclosure, the light path switching device 40 may switch the light beam between the first light path 30 and the second light path 20 at a switching frequency above 120 Hz, which may prevent the switching operation of the light path switching device 40 causes a flashing feeling to human eyes during the alternative display of the first and second display images.

In an example of the disclosure, the light path switching device 40 may comprise a rotatory reflector. The light beam 11 may be switched between the first light path 20 and the second light path 30 through rotation or swing of the rotatory reflector. For example, the light beam 11 is guided to the first light path 20 when the rotatory reflector rotates or swings to a first position and is guided to the second light path 30 when the rotatory reflector rotates or swings to a second position. This rotatory reflector may be electronically controlled to rotate at a high frequency conveniently.

In an example of the disclosure, as shown in FIG. 1, the first light path 20 may be provided with a first reflector 22 and a first projection lens 23 therein. When the light path switching device 40 switches the light beam 11 emitted from the light source 10 to the first light path 20, the first reflector 22 guides the light beam 11 from the light path switching device 40 to the light modulation device 50, and the first projection lens 23 projects the light beam modulated by the light modulation device 50 to the first display position 31. The second light path 30 may be provided with a second reflector 32 and a second projection lens 33 therein. When the light path switching device 40 switches the light beam 11 emitted from the light source 10 to the second light path 30, the second reflector 32 guides the light beam 11 from the light path switching device 40 to the light modulation device 50, and the second projection lens 33 projects the light beam modulated by the light modulation device 50 to the second display position 21. Since the first light path 20 and the second light path 30 have different light traveling directions, the display images may be displayed at the first display position 31 and the second display position 21, respectively.

In the above embodiments of the disclosure, the first display position 31 and the second display position 21 may be spaced apart from each other without overlapping with each other. For example, the first display position 31 and the second display position 21 may be arranged to be separated from each other in a left-right direction or front-back direction. Projection screens may be provided at the first display position 31 and the second display position 21.

In the embodiments of the disclosure, the light source 10 may include various light sources in the art such as a mercury lamp, a light-emitting diode, a fluorescent lamp.

Although the disclosure is described with reference to the accompanying drawings, the embodiments disclosed in the accompanying drawings are intended to illustrate the preferable embodiments of the disclosure, rather than being interpreted as a limiting to the disclosure. In order to clearly describe the necessary components and parts, the scale of illustrative drawings will not denote the real scale relationship thereof.

Although some embodiments of the general concept of the disclosure have been described and shown, it should be understood by those skilled in the art that changes and modifications may be made to these embodiments without departing from the principle and spirit of the general inventive concept. The scope of the disclosure is solely defined by claims and their equivalents.

What is claimed is:

1. A projection display apparatus comprising:
    a light source for emitting a light beam;
    a first light path configured to project the light beam emitted from the light source to a first display position;
    a second light path configured to project the light beam emitted from the light source to a second display position;
    a light path switching device configured to switch the light beam emitted from the light source between the first light path and the second light path; and
    a light modulation device through which both the first light path and the second light path pass, wherein the light modulation device is configured to modulate the light beam passing therethrough to generate a display image,
    wherein a first reflector and a first projection lens are provided in the first light path, and a second reflector and a second projection lens are provided in the second light path.

2. The projection display apparatus according to claim 1, wherein the light modulation device is configured to modulate the light beam in the first light path to generate a first display image for the first display position when the light path switching device switches the light beam emitted from the light source to the first light path, and to modulate the light beam in the second light path to generate a second display image for the second display position when the light path switching device switches the light beam emitted from the light source to the second light path.

3. The projection display apparatus according to claim 2, wherein the first display image is different from the second display image.

4. The projection display apparatus according to claim 3, wherein when the light path switching device switches the light beam emitted from the light source to the first light path, the first reflector is configured to guide the light beam from the light path switching device to the light modulation device, the first projection lens is configured to project the light beam modulated by the light modulation device to the first display position; and
    wherein when the light path switching device switches the light beam emitted from the light source to the second light path, the second reflector is configured to guide the light beam from the light path switching device to the light modulation device, and the second projection lens is configured to project the light beam modulated by the light modulation device to the second display position.

5. The projection display apparatus according to claim 2, wherein the light modulation device comprises a light intensity modulation portion having a plurality of first modulation units configured to modulate a light intensity of the light beam in the first light path to form an intensity distribution in the light beam of the first light path corresponding to the first display image, and a plurality of second modulation units configured to modulate a light intensity of the light beam in the second light path to form an intensity distribution in the light beam of the second light path corresponding to the second display image.

6. The projection display apparatus according to claim 5, wherein the first modulation units and the second modulation units are arranged to alternate with each other.

7. The projection display apparatus according to claim 6, wherein each of the first and second modulation units has a size less than 0.032 mm.

8. The projection display apparatus according to claim 6, wherein when the light path switching device switches the light beam emitted from the light source to the first light path, the first reflector is configured to guide the light beam from the light path switching device to the light modulation device, the first projection lens is configured to project the light beam modulated by the light modulation device to the first display position; and
    wherein when the light path switching device switches the light beam emitted from the light source to the second light path, the second reflector is configured to guide the light beam from the light path switching device to the light modulation device, and the second projection lens is configured to project the light beam modulated by the light modulation device to the second display position.

9. The projection display apparatus according to claim 5, wherein the light intensity modulation portion is configured to regulate light transmittance of the second modulation units for the light beam to be lower than a predetermined value when the light path switching device switches the light beam emitted from the light source to the first light path and to regulate light transmittance of the first modulation units for the light beam to be lower than the predetermined value when the light path switching device switches the light beam emitted from the light source to the second light path.

10. The projection display apparatus according to claim 5, wherein the light intensity modulation portion is in a normally dark mode.

11. The projection display apparatus according to claim 5, wherein the light source is a white light source and the light modulation device further comprises a color filter comprising a plurality of color filtering units, each of which comprises a plurality of pairs of color filtering subunits sequentially arranged, each pair of color filtering subunits only allows light of one color to pass therethrough, each pair of color filtering subunits comprises a first color filtering subunit and a second color filtering subunit adjacent thereto, each of the first color filtering subunits corresponds to one of the first modulation units of the light intensity modulation portion, and each of the second color filtering subunits corresponds to one of the second modulation units of the light intensity modulation portion.

12. The projection display apparatus according to claim 11, wherein the plurality of pairs of color filtering subunits comprise a pair of red filtering subunits, a pair of green filtering subunits and a pair of blue filtering subunits.

13. The projection display apparatus according to claim 5, wherein the light intensity modulation portion is formed by a liquid crystal light valve.

14. The projection display apparatus according to claim 5,
wherein when the light path switching device switches the light beam emitted from the light source to the first light path, the first reflector is configured to guide the light beam from the light path switching device to the light modulation device, the first projection lens is configured to project the light beam modulated by the light modulation device to the first display position; and
wherein when the light path switching device switches the light beam emitted from the light source to the second light path, the second reflector is configured to guide the light beam from the light path switching device to the light modulation device, and the second projection lens is configured to project the light beam modulated by the light modulation device to the second display position.

15. The projection display apparatus according to claim 2,
wherein when the light path switching device switches the light beam emitted from the light source to the first light path, the first reflector is configured to guide the light beam from the light path switching device to the light modulation device, the first projection lens is configured to project the light beam modulated by the light modulation device to the first display position; and
wherein when the light path switching device switches the light beam emitted from the light source to the second light path, the second reflector is configured to guide the light beam from the light path switching device to the light modulation device, and the second projection lens is configured to project the light beam modulated by the light modulation device to the second display position.

16. The projection display apparatus according to claim 1, wherein the light path switching device is configured to switch the light beam between the first light path and the second light path at a switching frequency above 120 Hz.

17. The projection display apparatus according to claim 1, wherein the light path switching device comprises a rotatory reflector.

18. The projection display apparatus according to claim 1, wherein:
when the light path switching device switches the light beam emitted from the light source to the first light path, the first reflector is configured to guide the light beam from the light path switching device to the light modulation device, the first projection lens is configured to project the light beam modulated by the light modulation device to the first display position; and
when the light path switching device switches the light beam emitted from the light source to the second light path, the second reflector is configured to guide the light beam from the light path switching device to the light modulation device, and the second projection lens is configured to project the light beam modulated by the light modulation device to the second display position.

19. The projection display apparatus according to claim 1, wherein the first display position is spaced apart from the second display position without overlapping with each other.

20. A projection display apparatus comprising:
a light source for emitting a light beam;
a first light path configured to project the light beam emitted from the light source to a first display position;
a second light path configured to project the light beam emitted from the light source to a second display position;
a light path switching device configured to switch the light beam emitted from the light source between the first light path and the second light path; and
a light modulation device through which both the first light path and the second light path pass, wherein the light modulation device is configured to modulate the light beam passing therethrough to generate a display image,
wherein the light modulation device is configured to modulate the light beam in the first light path to generate a first display image for the first display position when the light path switching device switches the light beam emitted from the light source to the first light path, and to modulate the light beam in the second light path to generate a second display image for the second display position when the light path switching device switches the light beam emitted from the light source to the second light path,
wherein the light modulation device comprises a light intensity modulation portion having a plurality of first modulation units configured to modulate a light intensity of the light beam in the first light path to form an intensity distribution in the light beam of the first light path corresponding to the first display image, and a plurality of second modulation units configured to modulate a light intensity of the light beam in the second light path to form an intensity distribution in the light beam of the second light path corresponding to the second display image,
wherein the light intensity modulation portion is in a normally dark mode, and
wherein the light intensity modulation portion is configured to respectively apply drive signals corresponding to the first display image to the first modulation units so as to generate the first display image without applying any drive signals to the second modulation units when the light path switching device switches the light beam emitted from the light source to the first light path, and to respectively apply drive signals corresponding to the second display image to the second modulation units so as to generate the second display image without applying any drive signals to the first modulation units when the light path switching device switches the light beam emitted from the light source to the second light path.

* * * * *